INVENTOR.
Vaito K. Eloranta
BY Brown and Mikulka
and
Robert E. Cork
ATTORNEYS

Jan. 18, 1966  V. K. ELORANTA  3,229,605
SELF DEVELOPING CAMERA
Filed July 31, 1963  6 Sheets-Sheet 4

FIG. 5

INVENTOR
Vaito K. Eloranta
BY Brown and Mikulka
and
Robert E. Cork
ATTORNEYS

United States Patent Office 3,229,605
Patented Jan. 18, 1966

3,229,605
SELF DEVELOPING CAMERA
Vaito K. Eloranta, Needham, Mass., assignor to Polaroid Corporation, Cambridge, Mass., a corporation of Delaware
Filed July 31, 1963, Ser. No. 298,969
10 Claims. (Cl. 95—13)

This invention relates to photographic apparatus and particularly to apparatus such as a camera for exposing and thereafter treating with a liquid successive areas of a photosensitive image-recording sheet.

In the copending U.S. Patent Application of Edwin H. Land, Serial No. 298,968, filed on an even date herewith, there is described photographic apparatus in the form of a camera in which successive areas of an image-recording sheet are exposed and thereafter processed to produce positive transfer prints on a second sheet. The second sheet is impregnated with the processing liquid and is stored within a container within the camera; and processing of each successive exposed area is accomplished by withdrawing a portion of the liquid impregnated second sheet from the container and pressing it into contact with the exposed area of the image-recording sheet. The container is kept in a sealed condition except during withdrawal movement of the second sheet, and the two sheets are pressed into contact by advancing them in superposition between a pair of pressure-applying members, preferably rolls having pliant (elastomeric) surfaces.

An object of the invention is to provide in photographic apparatus of the type described, novel and improved operating and control means for advancing successive areas of an image-recording sheet through the apparatus into position for exposure and then pressing each successive area into superposition with a portion of a second sheet which is withdrawn from a container by the operating and control means.

Another object of the invention is to provide operating and control means in photographic apparatus for moving a pair of pressure-applying members toward and away from one another and opening and closing a container in coordination with the commencement and termination of movement of image-recording and second sheets through the apparatus.

Other objects of the invention will in part be obvious and will in part appear hereinafter.

The invention accordingly comprises the apparatus possessing the construction, combination of elements and arrangement of parts, which are exemplified in the following detailed disclosure, and the scope of the appplication of which will be indicated in the claims.

For a fuller understanding of the nature and objects of the invention, reference should be had to the following detailed description taken in connection with the accompanying drawings wherein.

The basic components of the camera of the invention include: a housing for enclosing a supply, e.g., roll, of a photosensitive image-recording sheet; means for locating successive areas of the image-recording sheet in position for exposure; juxtaposed members for pressing exposed areas of the image-recording sheet into superposition with successive areas of a liquid impregnated second sheet; closure means for sealing a container, holding the second sheet and liquid, against the admission of gas and providing a sealable opening in the container through which the second sheet can be withdrawn; drive means for advancing the sheets through the camera and into superposition; and means coupled with the drive means for opening the container during movement of the sheets and retaining the container in a closed and sealed condition at other times.

The camera is especially designed for producing multicolor photographic transfer prints according to the process disclosed in U.S. Patent No. 2,983,606 issued May 9, 1961, to Howard G. Rogers; and utilizing integral multilayer negatives incorporating dye developers such as are disclosed in the copending U.S. application to Edwin H. Land and Howard G. Rogers, Serial No. 565,135, filed February 13, 1956.

In this process the multilayer negative (sheet) is exposed to form a latent image, is superposed with a second sheet including a receiving layer for image-forming dyes transferred by diffusion from the negative sheet; and a liquid reagent is distributed between the two sheets for permeation into the layers of the negative containing the photosensitive materials and dye developers and the image-receiving layer. The liquid reagent is alkaline in nature and serves to render the other reagents, particularly the developers, reactive to develop the latent image, or images, thereby immobilizing image-forming dyes in areas where image development occurs and causing image-forming dyes in unexposed areas to transfer by diffusion to the image-(dye)-receiving layer. The process performed by the camera of the invention and the products useful therein differ from known processes and products basically in the manner in which the liquid is supplied for permeation into the negative layers. Heretofore, this has been accomplished by providing a quantity of the liquid including a thickening agent in a layer between the two sheets and spreading the thickened (viscous) liquid in a thin layer over each exposed area by moving the sheets in superposition relative to and between a pair of pressure-applying members. It has been the practice to provide the liquid for processing successive areas in either of two ways, these being in a succession of rupturable containers mounted on one of the sheets for movement together with the sheets between the pressure-applying members, or in separate containers which are moved with respect to the sheets for dispensing their liquid contents between the sheets for subsequent distribution.

The aqueous alkaline liquid required for processing is carried by the image-receiving layer itself thus making possible a very simple film assemblage essentially comprising two sheets and a container for the image-receiving sheet and liquid; as compared with existing film assemblages including such components as masks, containers, liquid-trapping devices, indexing members and the like, requiring careful and precise fabrication and assembly to insure proper operation, registration and location of the various components during processing. The processing components of the camera are correspondingly simple since they are not required to dispense and/or distribute a viscous processing liquid in a precise manner and trap excess processing liquid, but are required only to press the two sheets into face-to-face contact since the liquid is already distributed in the required amount in the image-receiving layer on one of the sheets.

The liquid carried by the image-receiving layer is highly alkaline, this alkalinity being achieved by the inclusion in the liquid of an alkali metal hydroxide, such as sodium hydroxide or potassium hydroxide, preferably in sufficient quantity to achieve a pH of at least 12. In order to maintain the liquid in this highly alkaline condition, it is necessary to exclude carbon dioxide, such as is found in the atmosphere, from the liquid and for this reason the camera includes a container and/or a container closure for protecting the liquid-carrying, image-receiving sheet from the atmosphere while allowing successive areas of the image-receiving sheet to be withdrawn from a container (gas impermeable) in the camera and pressed into superposition with successive exposed areas of the image-recording sheet. The container and container closure may comprise components of the camera or cooperating components of both the camera and film assemblage employed therein, while achieving a primary object in providing the simplest and least expensive (expendable) film assemblage capable of being processed in the least complicated and expensive camera.

The film assemblage employed in the camera of the invention comprises a multilayer negative or image-recording sheet and image-receiving sheet including an image-receiving layer impregnated with an aqueous alkaline liquid, with the two sheets being joined to one another at their leading ends, and a container for the liquid-impregnated receiving sheet. A typical multilayer negative for producing multicolor transfer prints includes blue sensitive, green sensitive and red sensitive silver iodobromide emulsion layers having positioned behind them, respectively, a yellow dye developer, a magenta dye developer and a cyan dye developer; gelatin interlayers positioned between the yellow dye developer layer and the green sensitive emulsion and between the magenta dye developer layer and the red sensitive emulsion; and a support from the emulsion layer, dye developer layers, and gelatin inner layers. Multilayer negatives of this type are disclosed, for example, in FIG. 9 of the aforementioned U.S. Patent No. 2,983,606.

The image-receiving sheet comprises a support, preferably of a material which is chemically inert to, is insoluble in and impermeable to aqueous alkaline liquids, and an image-receiving layer of a material receptive to the aforementioned dye developers, securely adhered to the support and so constituted, by virtue of its composition and thickness, as to retain an amount of liquid sufficient to process the negative. In a preferred embodiment of the image-receiving sheet, the aqueous alkaline liquid-permeable layer has a graded permeability ranging from an impermeable material on a support such as paper, to a highly permeable material swollen by the aqueous alkaline liquid. Such an image-receiving layer comprises a combination of strata of different composition and permeability bonded to one another and the support with the degree of swelling increasing progressively outward from the support.

Before pressing the liquid-containing, image-receiving sheet into contact with the exposed photosensitive sheet to effect the processing of the latter and the formation of a dye transfer image on the image-receiving sheet, either or both surfaces of the image-receiving sheet are squeegeed to remove excess liquid from the image-receiving layer and render the surface of the support tactually dry. The processing liquid required for treating the photosensitive sheet is contained entirely within the swollen, image-receiving layer so that this layer too may appear to be substantially dry to the touch, and, in any event, no free liquid need remain on the surface of the image-receiving layer following the squeegeeing operation.

The sandwich comprising the two superposed sheets may be advanced directly from the camera in which exposure and processing is accomplished and accordingly, the supports for both the photosensitive and image-recording sheets are each formed of a material or provided with a layer which is opaque to actinic light.

The camera, designated 10, embodying the invention comprises a housing (see FIGS. 1, 2 and 5) including three relatively movable sections designated a forward section 12, a rear section 14 and an end section 16. The forward section of the camera housing comprises a forward wall 18 having a generally rectangular opening therein including a recessed section defined by an upper side wall 20, a lower side wall 22, end walls 24 and 26 and a rear wall 28 provided with a rectangular exposure aperture 30. The camera is of the folding type and includes a conventional lens and shutter assembly 32 coupled with rear wall 28 by a bellows 34 which is collapsible (the usual erecting mechanism is not shown), to permit the bellows and lens and shutter assembly to be contained within the recess in the forward housing section.

The rear housing section includes a rear wall 36 having a curved end section 38 (at the left in the drawings) at which the rear housing section is pivotally secured to the forward housing section by a hinge 40. The forward and rear housing sections, specifically forward wall 18, upper and lower side walls 20 and 22 and wall 24 and end section 38 of rear wall 36 cooperate to provide a storage chamber 42 for mounting and enclosing a roll of a photosensitive image-recording sheet 44 of the type described. The rear housing section also includes a portion designated 46 located at the end of rear wall 36 opposite end section 38 which projects rearwardly from rear wall 36 and includes a wall 48 having an L-shaped cross section (viewing FIG. 5) and upper and lower side walls 50 which are disposed above and below upper and lower side walls 20 and 22. The rear housing section is pivotable between the closed or operative position shown in FIGS. 1, 3 and 5 in which the forward and rear housing sections cooperate to provide closed storage chamber 42; and an open position shown in FIG. 2 at which access is provided to chamber 42 for loading a roll of image-recording sheet 44 into the storage chamber and threading the sheet or a leader attached thereto through the camera between rear walls 28 and 36 across exposure aperture 30. The rear surface of rear wall 28 and the forward surface of rear wall 36 are located generally at the focal surface of the lens of assembly 32 and cooperate to locate successive areas of the image-recording sheet in position for exposure to light transmitted by the lens through aperture 30.

Forward housing section 12 includes an enlarged end section comprising outer upper and lower walls 52 and 54 sepaced from and cooperating with upper and lower walls 20 and 22 to define chambers 56 and 58 at an end of the forward housing section in respectively the upper and lower portions thereof for enclosing components of the operating mechanism of the camera. The forward housing section also includes an end wall designated 60 spaced from end wall 26 and cooperating with the latter, forward wall 18 and upper and lower walls 20 and 22 to provide another chamber 62 for enclosing components of the apparatus. End wall 60 also functions to provide a wall for a sealed container (to be described hereinafter). End walls 26 and 60 extend rearwardly to join rear wall 36 at the end of the forward housing section 12 furthest from chamber 42.

End section 16 of the camera housing includes a forward wall 64, a curved end wall 66, a rear wall 68, inner upper wall 70, outer upper wall 72, inner lower wall 74 and an outer lower wall 76. The inner and outer upper walls cooperate to define a chamber 78, and the inner and outer lower walls cooperate to define chamber 80, chambers 78 and 80 being provided for enclosing elements of the camera. The inner upper and lower walls 70 and 74, forward wall 64, end wall 66, and rear wall 68 cooperate to provide an open storage chamber 82 for a supply of the image-recording sheet designated 84. End section 16 is coupled with forward housing section 12 by a hinge 86 constructed to provide for limited linear movement of the end section relative to the forward section as well as pivotal movement of the two sections with respect to one another. Hinge 86 is secured to forward walls 18 and 64 of, respectively, the forward and end housing sections and permits the end section to be pivoted with respect to the forward section between the operative or closed position shown in FIGS. 1, 3 and 5, and the open or inoperative position shown in FIG. 2. In the closed position of the end section of the housing, end wall 60 of the forward section cooperates with the end section to provide a closure for storage chamber 82, whereas in the open position of the end section, chamber 82 is open to permit loading of a supply of an image-receiving sheet 84 into chamber 82.

End section 16 of the housing includes a rearwardly projecting portion 88 comprising upper and lower walls 90 joined by an L-shaped wall 92 extending rearwardly from rear wall 68 and then parallel with the rear wall and cooperating with upper and lower walls 90 to provide a chamber 94 for enclosing components of the apparatus.

Figure 1:
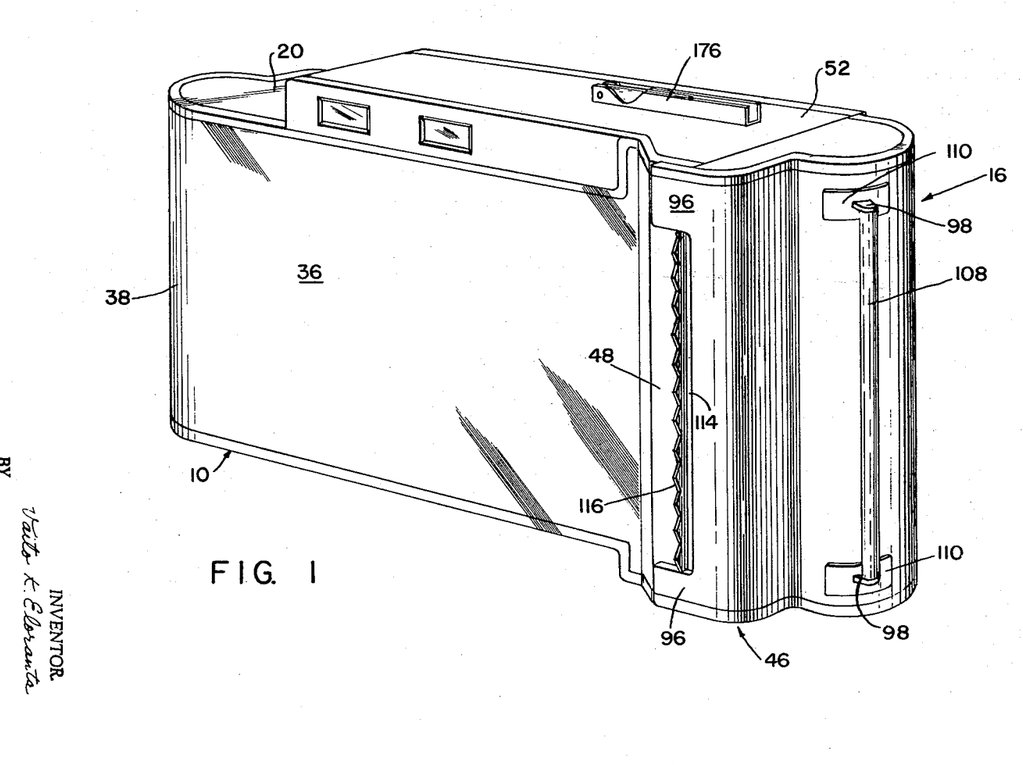
FIGURE 1 is a perspective view of photographic apparatus in the form of a camera embodying the invention.
Figure 2:
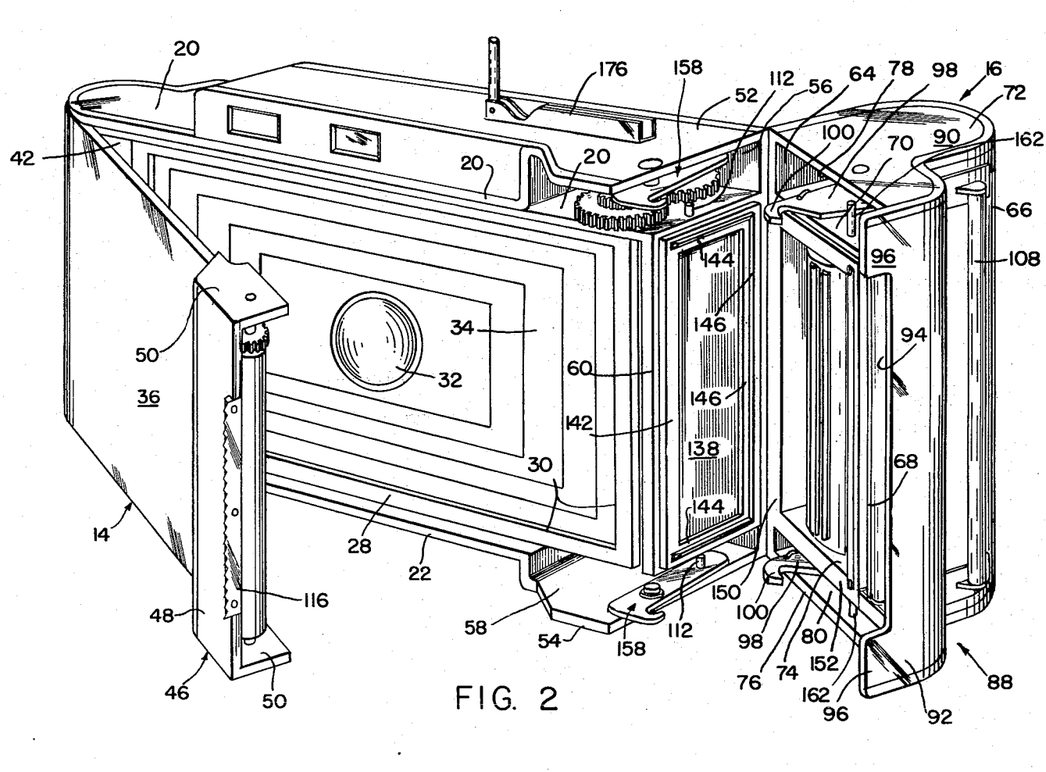
FIG. 2 is a view similar to FIGURE 1 showing the camera with components of the housing thereof in an open position.
Figure 3:
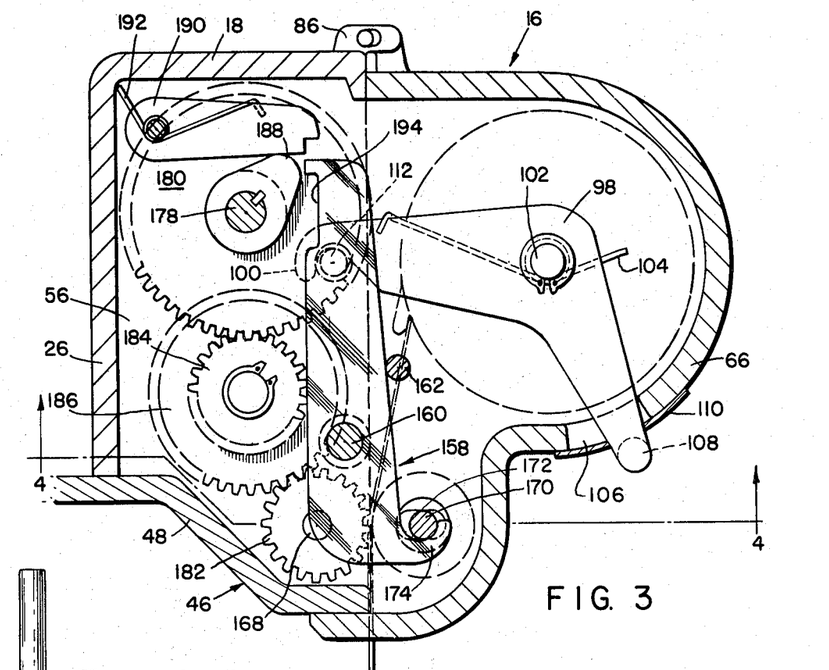
FIG. 3 is a fragmentary sectional view of the camera taken substantially along the line 3—3 of FIG. 4.
Figure 5:
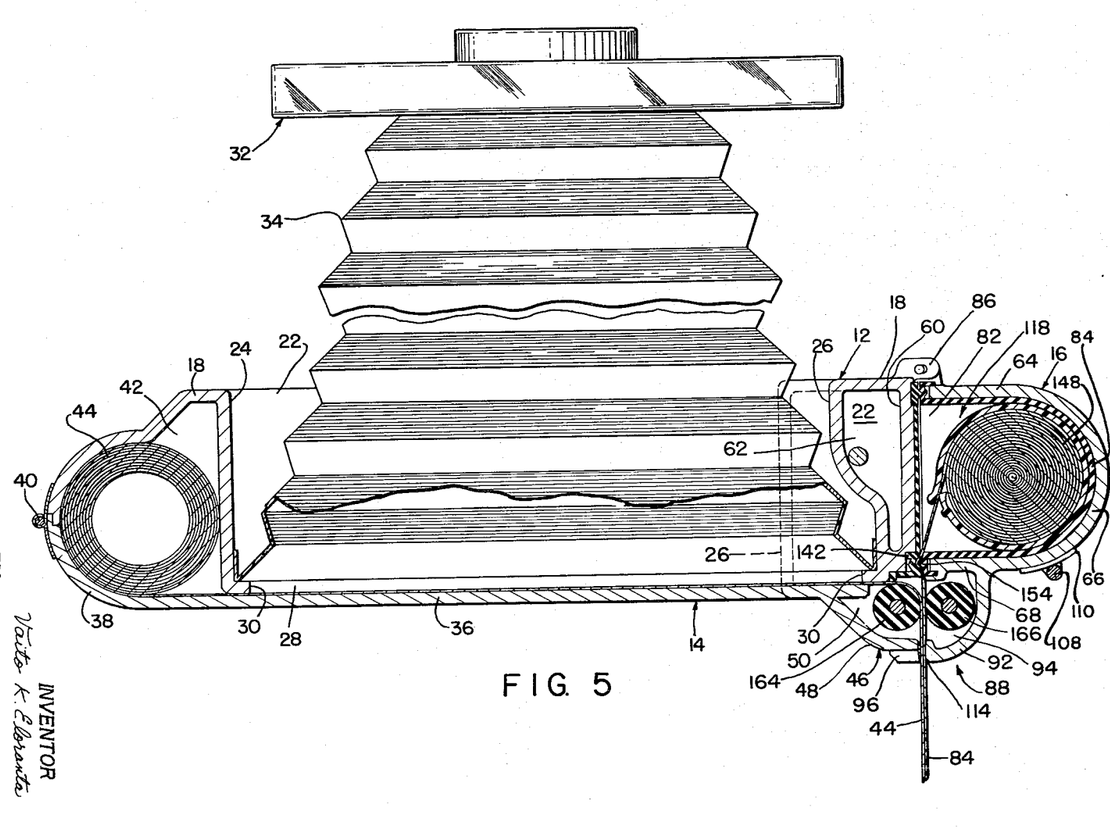
FIG. 5 is a sectional view of the camera taken substantially midway between the upper and lower sides thereof and showing a film assemblage within the camera.

The camera includes means for retaining the housing sections in the closed or operative position shown in FIGS. 1, 3 and 5. These means comprise extensions 96 on the upper and lower portions of L-shaped wall 92 which extend, in the closed position of the housing, outside of wall 48 of portion 46 of rear housing section 14. In order to close the housing, the rear housing section is pivoted from the open position shown in FIG. 2 to a closed position whereupon end section 16 is pivoted from an open position to a closed position so that extensions 96 extend outside of wall 48 preventing pivotal movement of the rear housing section from its closed position. Latch means are provided for retaining end housing section 16 in its closed position and in the form shown comprise a pair of generally L-shaped latching arms 98 each having a hook 100 on its inner end. Arms 98 are pivotally mounted intermediate their ends coaxially within chambers 78 and 80 on studs 102 and are biased into latching position, that is, in a counterclockwise direction viewing FIG. 3, by torsion springs 104. The ends of arms 98 opposite hooks 100 project from chambers 78 and 80 through slots 106 in end walls 66 and are coupled with one another by a bar 108 which may be engaged manually for pivoting latch arms 98 between latched and unlatched positions. Cover plates 110 are provided adjacent the outer ends of arms 98 for preventing the admission of light into the camera housing through slots 106. Latching studs 112 are provided mounted on upper and lower side walls 20 and 22 within chambers 56 and 58 of forward housing section 12 in position to be engaged by hooks 100 when the end housing section is pivoted into closed position and thereby retain the end housing section in closed position.

In the operative position of the housing sections, walls 48 and 92 and extensions 96 of wall 92 cooperate to define a slot 114 connecting with chamber 94 defined by portions 46 and 88 of the rear and end housing sections. Slot 114 is dimensioned to permit withdrawal of the image-recording and image-receiving sheets in superposition from the camera housing and a cutting bar 116 having a sharpened, serrated edge is provided within slot 114 on wall 48 for facilitating the severance of sheet materials extending from the camera housing through the slot.

Figure 6:
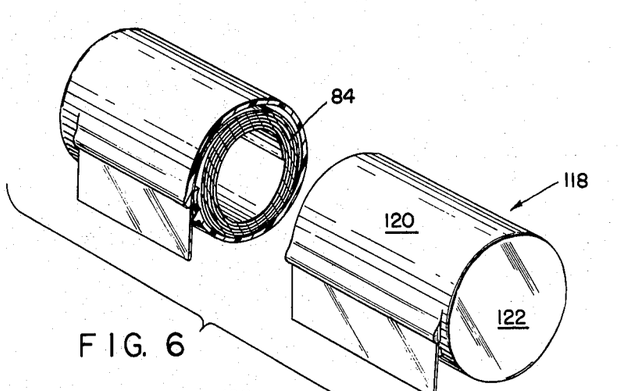
FIG. 6 is a perspective view, partially in section, of a film assemblage adapted for use in the apparatus of the invention.
Figures 7, 8:
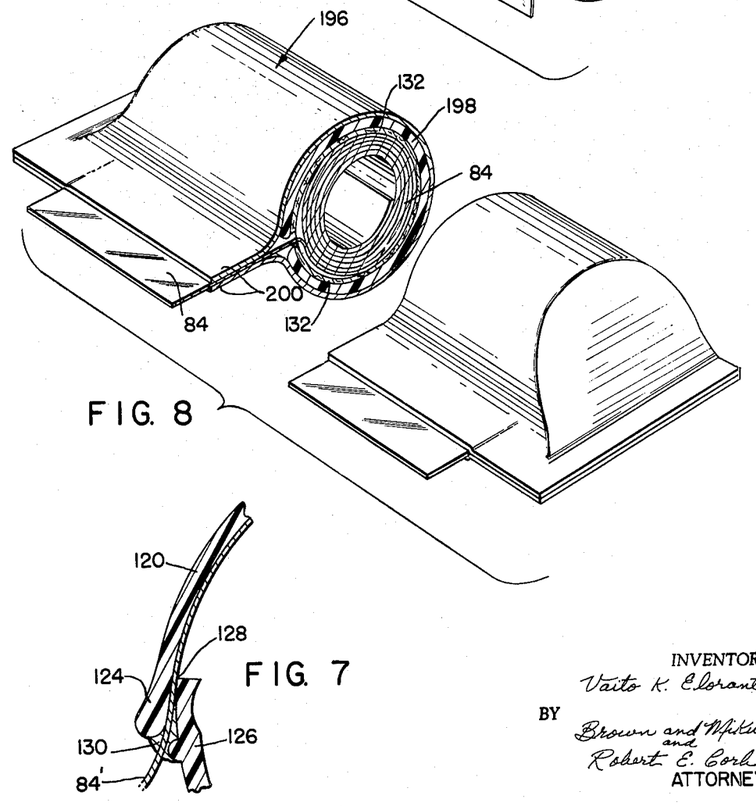
FIG. 7 is a fragmentary sectional view of a portion of the film assemblage of FIG. 6.
FIG. 8 is a perspective view, partially in section, of another form of film assemblage useful in the camera embodying the invention.

Photosensitive image-recording sheet 44 is supplied in a coiled condition in the usual manner, e.g., on a spool, is housed in chamber 42 and is threaded from the chamber across opening 30 between rear walls 28 and 36 into chamber 94. The liquid impregnated image-receiving sheet 84 is supplied in a coiled condition in a container which is substantially impermeable to the processing liquid, water vapor and gases, particularly carbon dioxide. A typical container for the liquid impregnated image-receiving sheet is illustrated in FIGS. 5, 6 and 7 of the drawings. This container, designated 118, includes a generally cylindrical peripheral wall 120 and two circular end walls 122. Wall 120 is provided with an axial slot defined by a pair of overlapping outer and inner lips designated, respectively, 124 and 126. The edge portion of the outer lip is thickened and the inner lip is provided with a rib to stiffen the two lips and retain them in a closed position in engagement with a portion of image-receiving sheet 84 extending from the container through the passage between the lips. The edge 128 of inner lip 126 closest the outer lip is provided with a sharpened corner designed to function as a squeezee for removing liquid from a surface of image-receiving sheet 84. Container 118 may be formed of any suitable material, particularly organic plastics, such as polyethylene, which are air and water vapor impervious and are compatible with aqueous alkaline liquids. The image-receiving sheet is supplied in a coiled condition in container 118 with a leading end portion of the sheet extending from the container through the passage between lips 124 and 126. Additional means may be provided for sealing the passage against the admission of air and the leakage of water or water vapor and in the form shown these sealing means may comprise a seal 130 of some material, such as wax, which may be introduced in a softened or molten condition into the passage between lips 124 and 126 in surrounding relation to the sheet to fill the passage and form a rupturable bond between the sheet and container to prevent the passage of air and water between the lips.

Receiving sheet 84 may be coiled with the liquid impregnated image-receiving layer facing inwardly or outwardly and is shown in FIGS. 5 and 6 with the liquid impregnated layer facing outwardly. Since the container must be opened to permit the withdrawal of the image-receiving sheet and thus possibly permit escape of water vapor and/or admission of air, it may be desirable to provide a reservoir of excess processing liquid within the container together with means for gettering carbon dioxide so that any carbon dioxide gaining admission to the container does not react with the hydroxide in the processing liquid to reduce the pH thereof. The image-receiving sheet is preferably coiled tightly upon itself to help prevent contact between the liquid impregnated image-receiving layer and the atmosphere of the container. In order to prevent loss (by evaporation) of processing liquid from the image-receiving layer, the atmosphere of the container is preferably maintained saturated with water vapor by the provision of a reservoir of water or processing liquid. This reservoir of excess processing liquid or water may comprise the image-receiving layer itself which may be impregnated with excess liquid which could be removed by squeegeeing during withdrawal of the receiving sheet from the container. In this embodiment, squeegees would be provided on both lips 124 and 126 for removing liquid from both surfaces of the image-receiving sheet so that the sheet, upon withdrawal from the container, is substantially dry to the touch with all the liquid required for processing being retained within the image-receiving layer. In an alternative embodiment, water or processing liquid may be provided in a reservoir apart from the image-receiving sheet. Such a reservoir may comprise, for example, a liquid impregnated absorbent material such as a sheet shown and designated 132 in FIG. 8. Liquid impregnated sheet 132 is shown wrapped around the outside of the coiled image-receiving sheet, but in an alternative embodiment could be disposed within the coiled receiving sheet.

Figure 10:
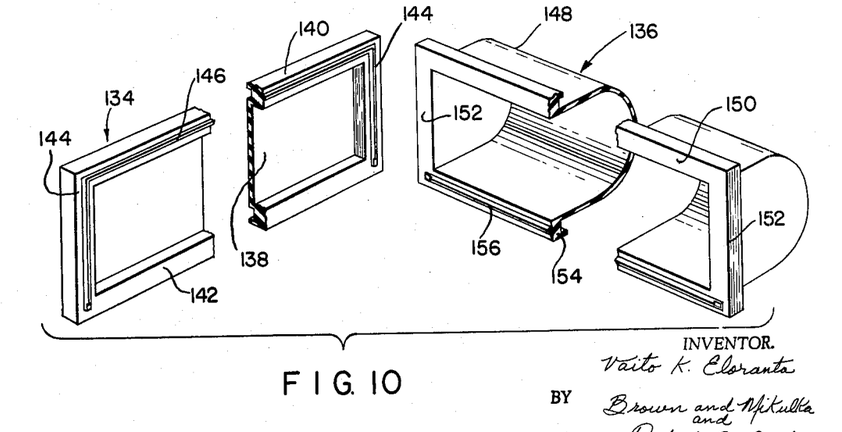
FIG. 10 is a perspective view, partially in section, showing components of the camera of FIG. 2.

Container 118 in which liquid impregnated sheet 84 is supplied is unsealed at the commencement of withdrawal of the image-receiving sheet therefrom and in the form shown remains unsealed thereafter. Accordingly, the camera in which the container is employed includes either: means for sealing the container against the escape of water vapor and the admission of carbon dioxide, or a container for holding container 118 and which may be sealed against the escape of water vapor and the admission of carbon dioxide, between times when the image-receiving sheet is being withdrawn from container 118 and/or the container within the camera. The camera shown in FIGS. 2 through 5 includes a container which is substantially impervious to water vapor and carbon dioxide, may be sealed against the admission or escape of water vapor and carbon dioxide and may be opened to permit the withdrawal movement of the image-receiving sheet therefrom. This container comprises storage chamber 82 and is defined by end wall 60, inner upper wall 70, inner lower wall 74 and end wall 66. Means are provided for sealing storage chamber 82 and, in the form shown in FIGS. 2, 5 and 10, comprise a pair of seals 134 and 136. Seals 134 and 136 are preferably formed of an elastomeric material which is compatible or unaffected by hydroxide, is substantially impervious to water vapor and carbon dioxide, and is highly resistant to assuming a permanent set. Seal 134 is generally rectangular in shape and includes a thin rectangular medial membrane 138 surrounded by marginal engagement portions termed and designated a forward sealing section 140, a rear sealing section 142 and end sealing sections 144. Forward sealing section 140 and end sealing sections 144 are formed with a continuous U-shaped projecting ridge 146 having a triangular cross section while rear sealing section 142 has a substantially flat surface. Seal 134 is secured to the surface of end wall 60 within storage chamber 82 and not only functions as a seal for the chamber but cooperates to protect end wall 60 from the highly corrosive processing liquid thereby permitting a wider choice of materials, including metals, for use in the construction of the camera housing.

Seal 136 includes a membrane 148 in the form of an open, tube-shaped container adapted to fit within storage chamber 82 against end wall 66 and inner and upper and lower walls 70 and 74. Seal 136 includes a forward sealing flange 150, end sealing flanges 152 and a rear sealing flange 154 which cooperate with, respectively, forward sealing section 140, end sealing section 144 and rear sealing section 142 to seal chamber 82 in the closed position thereof. Forward sealing flange 150 and end sealing flanges 152 include substantially flat surfaces which are engaged by the sharp edge of triangular ridge 146 to form a liquid and gas tight seal. Rear sealing flange 154 is provided with a projecting V-shaped ridge 156 which bears against the flat surface of rear sealing section 142 to form a water vapor and carbon dioxide impervious seal. The ends of ridges 146 and 156 are notched so as to overlap one another and cooperate to form a seal at the ends of the seal made by ridge 156. Ridge 156 may also function as a squeegee, and in an alternative embodiment may be provided on rear sealing section 142 rather than on rear sealing flange 154 as part of a continuous rectangular ridge and thereby function as a squeegee for removing liquid from that surface of the image-receiving sheet which faces seal 134 during withdrawal of the image-receiving sheet from storage chamber 82.

The camera housing sections are retained in closed position by latching arms 98 and studs 112 which are so designed as to cause compression of the mutually engageable sections of seals 134 and 136 when the camera housing sections are in closed position. In order to withdraw the image-receiving sheet from chamber 82, the chamber is opened at rear sealing section 142 and rear sealing flange 154 by pivoting end housing section 16 with respect to forward housing section 12 about an axis intermediate the forward and rear seals and extending approximately through the axis of studs 112. This pivotal movement is achieved by further compressing forward sealing section 140 and forward sealing flange 150 which, being elastomeric, function as a spring to close the seal at the rear of the storage chamber when the force tending to pivot the end housing section is removed. As a means for pivoting the end housing section to open the container to provide a withdrawal passage between rear sealing section 42 and rear sealing flange 154, there are provided a pair of levers 158 each pivotally mounted intermediate its ends on a stud 160 mounted in one of chambers 56 and 58 on respectively outer upper wall 52 and outer lower wall 54. Levers 158 are mounted coaxially and coact, when pivoted in a clockwise direction (viewing FIG. 3), with a pair of studs 162, one of which is mounted between inner and outer upper walls 70 and 72 and the other mounted between inner and outer lower walls 74 and 76.

To process an exposed area of image-recording sheet 44 to produce a transfer image in a corresponding area of the image-receiving sheet, the two sheets are pressed into superposition with one another. This processing is accomplished by a pair of pressure rolls 164 and 166. Each of rolls 164 and 166 is shown as comprising a metal shaft designated, respectively, 168 and 170, covered by an elastomeric material such that the rolls are slightly compressible and, in fact, the resiliency of the elastomeric material may be employed to apply the necessary pressure to the two sheets. Roll 164 is pivotally mounted on rear housing section 14 between upper and lower side walls 50 for movement into juxtaposition with roll 166 which is also mounted within chamber 94 on inner upper wall 70 and inner lower wall 74. Shaft 170 of roll 166 is journaled in slots 172 in inner upper wall 70 and inner lower wall 74 and extends into chambers 78 and 80 and thus mounting roll 166 for limited movement, in the closed position of the camera housing, toward and away from roll 164.

In the operative position of the camera housing sections, the rolls are urged against one another and for this purpose levers 158 are provided at their rearmost ends with hooks 174 for engaging shaft 170 of roll 166. In the operation of the camera, image-receiving sheet 84 extends from chamber 82 into superposition with image-recording sheet 44 between rolls 164 and 166. The rolls are rotated in engagement with the superposed sheets in order to superpose an exposed area of the photosensitive sheet with an area of receiving sheet and simultaneously advance the sandwich thus formed from the camera through slot 114 and advance the next succeeding area of the image-recording sheet into position for exposure in alignment with aperture 30. The means for rotating the rolls comprise a manually engageable crank 176 for rotating a shaft 178 extending downwardly through chambers 62 and 56. Keyed to shaft 178 is a gear 180 for driving a gear 182 keyed to shaft 168 through idler gears 184 and 186. The gear ratio is such that one complete revolution of crank 176 rotates roll 164 sufficiently to advance an exposed area of the image-recording sheet into superposition with the image-receiving sheet and from the camera. It should be noted that roll 164 is located as close as possible to the end edge of exposure aperture 30 and the opening into chamber 82 so as to minimize the length of sheet materials constituting waste between successive exposed areas of the photosensitive sheet and the length of the image-receiving sheet superposed therewith.

Rolls 164 and 166 are normally spaced apart from one another, i.e., between processing operations, which helps to prevent the elastomeric materials comprising the rolls from taking a set, and are urged toward one another to compress the sheets only during movement of the sheets between the rolls. At the same time the rolls are spaced apart, i.e., between processing operations, chamber 82 is sealed, the chamber being opened by spacing apart rear sealing section 142 and rear sealing flange 154 only during advancement of the sheets and withdrawal of the image-recording sheet. The apparatus includes means operated by crank 176 for simultaneously opening the container to permit withdrawal of the image-receiving sheet and urging roll 166 toward roll 164 to press the sheets against one another at the commencement of advancement of the sheets. These last-mentioned means also function to close the container and relieve the bias on roll 166 to terminate the advancement of the sheets through the apparatus after predetermined lengths of the sheets have been moved in superposition as a sandwich between rolls 164 and 166 from the apparatus through slot 114. Advancement of the sheets is terminated in three ways, that is, by relieving the bias on roll 166 urging the rolls into frictional engagement with the sheets so that rotation of the rolls is ineffective to advance the sheets further; by closing chamber 82 so that the rear sealing section 142 and rear sealing flange 154 grip the image-receiving sheet effectively sealing the chamber and preventing movement of the image-receiving sheet; and discontinuing the rotation of crank 176.

Figure 4:
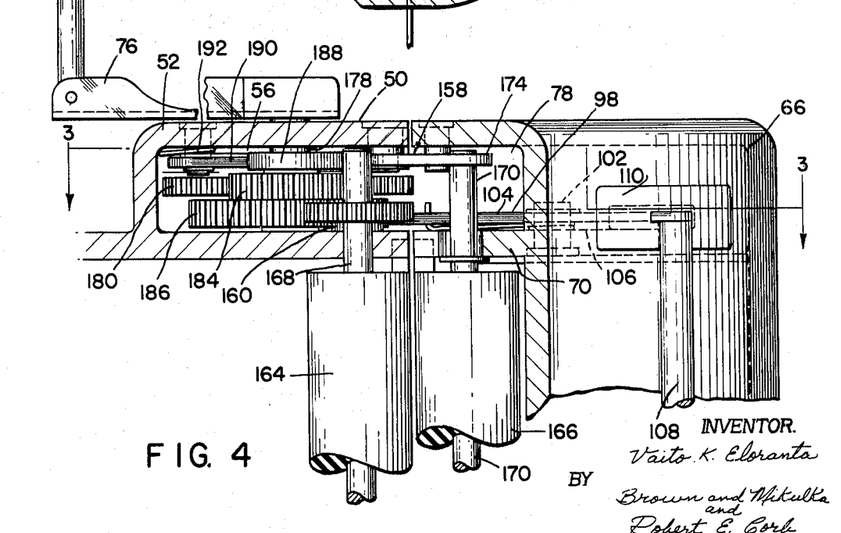
FIG. 4 is a sectional view of the camera taken substantially along the line 4—4 of FIG. 3.

The aforementioned means for indexing the advancement of the sheets, sealing and unsealing storage chamber 82 and biasing and relieving the bias on the rolls comprise cams 188 keyed near the ends of shaft 178 within chambers 56 and 58 for engaging the forward ends of levers 158 during the initial portion of the clockwise rotation of shaft 178 to pivot levers 158 in a clockwise direction opening chamber 82 and urging roll 166 toward roll 164. FIGS. 3 and 4 illustrate the operating mechanism of the camera in a position just prior to commencement of advancement of the sheets or, in other words, at the termination of advancement of preceding sections of the sheets. The mechanism is designed and constructed so that after the initial rotation of shaft 178, the only torque required to be applied to the shaft is that necessary to rotate shaft 168 and roll 164 for advancing the sheets. This construction includes latch members 190 mounted for pivotal movement within chambers 56 and 58 and urged in a clockwise direction (viewing FIG. 3) by torsion springs 192 toward the forward ends of levers 158. Thus the latch members and levers are so arranged that when the levers are pivoted during the initial portion of the rotation of cams 188, latch members 190 pivot into engagement with levers 158 retaining the levers in their pivoted (clockwise) position at which the levers retain storage chamber 82 in an open position and urge roll 166 toward roll 164. Levers 158 include recesses 194 which provide for clearance between cams 188 and the levers so that the cams may continue to rotate without engaging the levers. During the terminal portion of rotation of cams 188, the cams engage latch members 190 pivoting the latch members in a counterclockwise direction out of engagement with levers 158 thereby relieving the bias on roll 166 and permitting storage chamber 82 to return to a closed position.

The film assemblage including the sheet materials employed in the camera shown and described, is supplied with a leading end portion thereof, or leader attached thereto, extending from container 118 and coupled with a leader or the leading end of the image-recording sheet. To load the camera, the coil of image-recording sheet is introduced into chamber 42; the rear housing section is pivoted into closed position; the container of image-receiving sheet is loaded into chamber 82; and housing section 16 is then pivoted into closed position, and latching arms 98 are pivoted in a counterclockwise direction to retain the camera in closed position. The camera housing sections are thus closed with the coupled leaders extending between rolls 164 and 166 through slot 114. Crank 176 is then rotated through 360° to advance an area of the image-recording sheet into position for exposure. Following exposure of this and each succeeding area of the image-recording sheet, crank 176 is again rotated through one revolution to process each exposed area of the image-recording sheet by pressing it into superposition with an area of the image-receiving sheet to form a sandwich and advancing the sandwich from the camera through slot 114. The superposed areas of the two sheets comprising the sandwich may be severed from portions of the sheets remaining within the camera housing by drawing the sandwich against cutting bar 116. The sheets are retained in superposition during a processing period of predetermined duration at the end of which the sheets are separated to reveal a transfer print on the image-receiving sheet.

In another embodiment of the apparatus of the invention, the camera includes a seal, which may be opened and closed, for the container in which the image-recording sheet is supplied, rather than a complete container in itself, so that the camera and film assemblage combine to form a container which can be sealed and unsealed. In the form shown in FIG. 8, image-receiving sheet 84 is supplied in a coiled condition in a container in the form of a bag 196. The image-receiving sheet is coiled within a cylindrical sleeve 198 having an axial slot and designed to retain the image-receiving sheet in a coiled condition and allow it to be withdrawn from the coil. Bag 196 is formed by wrapping a generally rectangular sheet of a water vapor, alkali and gas impervious material around the coiled image-receiving sheet, bringing the edges of the sheet material comprising the bag together and sealing or adhering the edges to one another and to the sheet which is allowed to extend from the bag. The sheet material comprising the bag may be a multi-ply material formed, for example, of paper and/or metal foil with an inner ply of a polymeric material, preferably one which is thermoplastic and can be bonded to itself and other materials by application of heat and pressure. The completed container is formed with a pair of lips designated 200 releasably secured to the image-receiving sheet and defining a mouth through which the image-receiving sheet may be withdrawn. Alternatively, a clip or other means may be provided for holding lips 200 in a closed position prior to loading of the container into a camera. The film assemblage shown in FIG. 8 also includes a reservoir for excess water or processing liquid and a getter for carbon dioxide. This reservoir takes the form of sheet 132 of an absorbent material impregnated with the desired liquid disposed within sleeve 198 in surrounding relation to the coiled image-receiving sheet.

Figure 9:
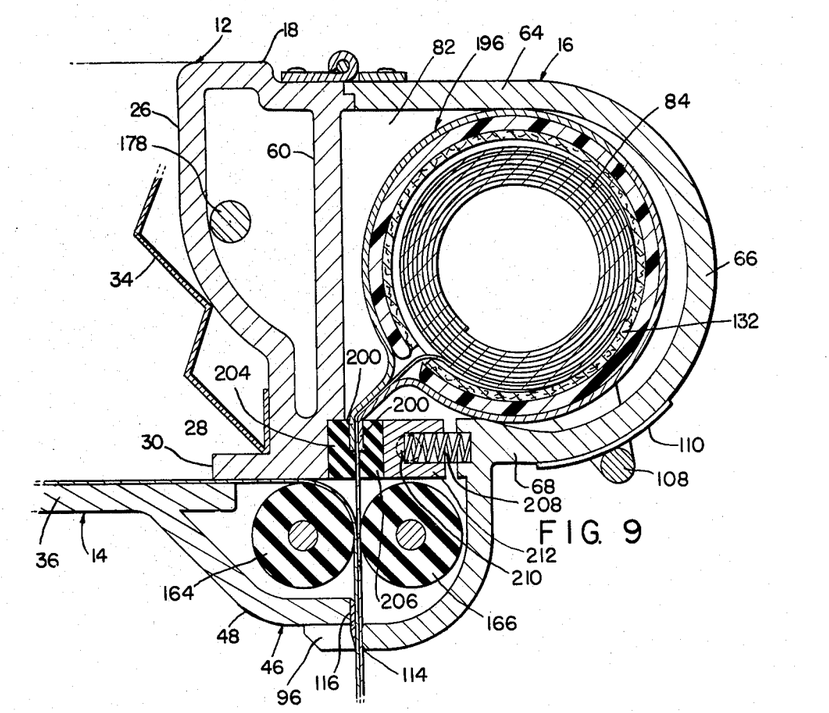
FIG. 9 is a view, similar to FIG. 5, of a modified embodiment of the camera incorporating the film assemblage of FIG. 8.

The camera for use with this film assemblage is shown in FIG. 9 and in most respects, is substantially the same as the camera shown in FIGS. 1 through 5 and differs therefrom primarily with regard to the sealing of storage chamber 82 and a seal for bag 196. Storage chamber 82 is provided without any means for sealing the chamber but instead, is provided with a container comprising a pair of shoes 204 and 206. Shoe 204 is mounted in fixed position on end wall 60 and shoe 206 is mounted on a block 212 mounted on rear wall 68 in juxtaposition with shoe 204 for movement toward and away from the latter. Each of the shoes comprises an elongated member formed of a pliant and/or elastomeric material such that when the shoes are pressed together with lips 200 engaged therebetween, the shoes effectively seal the lips against the admission of gas into the container or the escape of water vapor therefrom. The film assembly of FIG. 8 is positioned within storage chamber 82 with the edges of the lips disposed between the shoes, shoe 206 being urged toward shoe 204 by resilient means such as a spring or springs 208.

As a means for separating the shoes to permit withdrawal of image-receiving sheet 84 between lips 200, there are provided a pair of pins 219 extending from the ends of a block 212 on which shoe 206 is mounted. Pins 210 extend upwardly and downwardly into portions of the camera corresponding to chambers 78 and 80, and levers 158 are provided with cams (not shown) for coacting with the pins during pivotal movement of levers 158 in a clockwise direction to space shoe 206 apart from shoe 204. The form of camera shown in FIG. 9 is somewhat simpler than the one previously described inasmuch as chamber 82 is not required to function as a container thereby making seals 134 and 136 unnecessary and eliminating the necessity for a slidable hinge as shown in FIG. 5 and inner upper and lower walls 70 and 74. In most other respects the camera of FIG. 9, particularly the operating mechanism, is substantially the same as that previously described.

The camera shown and described is simple to load for use and easily operated by merely rotating a crank through 360° to feed a sandwich from the camera after each exposure is made, since opening and closing a sealed container and applying and relieving the bias on a pair of pressure rolls together with proper indexing of the sheets are all achieved with this one simple operation.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. In a photographic apparatus for exposing and thereafter treating with a liquid successive portions of a photosensitive image-recording sheet, in combination:
  a pair of sheet engagement members;
  support means mounting said members in juxtaposition for movement toward and away from one another;
  closure means for a container, said closure means including sections movable toward and away from one another between open and closed positions;
  means for retaining said sections in a closed position and spacing said engagement members apart from one another;
  drive means for advancing said image-recording sheet through said apparatus into superposition with a second sheet disposed within said container and extending between said sections and advancing said sheets in superposition between said engagement members; and
  means coupled with said support means and said closure means and operated by said drive means for simultaneously moving said engagement members toward one another into pressing engagement with said superposed sheets and spacing said sections of said closure means apart from one another to permit movement of said second sheet between said sections during advancement of said sheets through said apparatus and in superposition between said engagement members.

2. The photographic apparatus of claim 1 in which said engagement members comprise rolls mounted with their axes substantially in a plane.

3. The photographic apparatus of claim 2 in which said rolls include portions formed of an elastically deformable material for engaging said sheets.

4. The photographic apparatus of claim 2 in which said drive means include means for rotating at least one of said rolls.

5. The photographic apparatus of claim 1 in which said sections of said closure means include elastically deformable members cooperating to define an opening through which said second sheet is movable and, in the closed position of said sections, engage said second sheet and substantially seal said opening against the passage of carbon dioxide therethrough.

6. The photographic apparatus of claim 1 in which the last-mentioned means comprise means responsive to movement of a predetermined length of said image-recording sheet through said apparatus for moving said sections of said closure means toward one another into engagement with said second sheet to arrest the movement of said second sheet therebetween; at least one of said engagement members is in the form of a roll; and said drive means include means for rotating said roll in engagement with one of said sheets to advance said sheets through said apparatus between said engagement members.

7. In photographic apparatus for exposing and thereafter treating with a liquid successive portions of a photosensitive image-recording sheet, in combination:
  a pair of pressure members including a roll for frictionally engaging a sheet;
  support means mounting said pressure members in juxtaposition for movement toward and away from one another into and from pressing engagement with said sheet and mounting said roll for rotation in engagement with said sheet to effect the advancement of said sheet between said pressure members;
  closure means for a container, said closure means including sections movable toward and away from one another between open and closed positions;
  control means for moving said sections between said open and closed positions and moving said pressure members toward and away from one another; and
  drive means for rotating said roll to advance said image-recording sheet through said apparatus into superposition with a second sheet between said pressure members and advancing said second sheet from said container between said sections of said closure means and in superposition with said image-recording sheet between said pressure members;
  said drive means being coupled with said control means for simultaneously urging said pressure members toward one another into pressing engagement with said superposed sheets and spacing said sections of said closure means apart from one another at the commencement of advancement of said sheet, and simultaneously moving said pressure members apart from one another and said sections of closure means toward one another into said closed position to terminate the advancement of said sheets following the advancement of a predetermined length of said image-recording sheet through said apparatus between said pressure members.

8. The photographic apparatus of claim 7 in which said control means comprise resilient means for biasing said pressure members apart from one another and said sections of said closure means toward one another into said closed position, and means driven by said drive means for moving said pressure members and said sections against the bias of said resilient means.

9. The photographic apparatus of claim 8 in which said resilient means include portions of said closure means.

10. The photographic apparatus of claim 7 in which said roll includes a portion formed of an elastically deformable material for engaging said sheet.

No references cited.

JOHN M. HORAN, *Primary Examiner.*